Jan. 9, 1951  G. H. SMITH ET AL  2,537,165
SHAPING UNICRYSTALLINE BODIES OF MATERIAL
SUCH AS CORUNDUM AND SPINEL
Filed Dec. 13, 1944  2 Sheets-Sheet 2
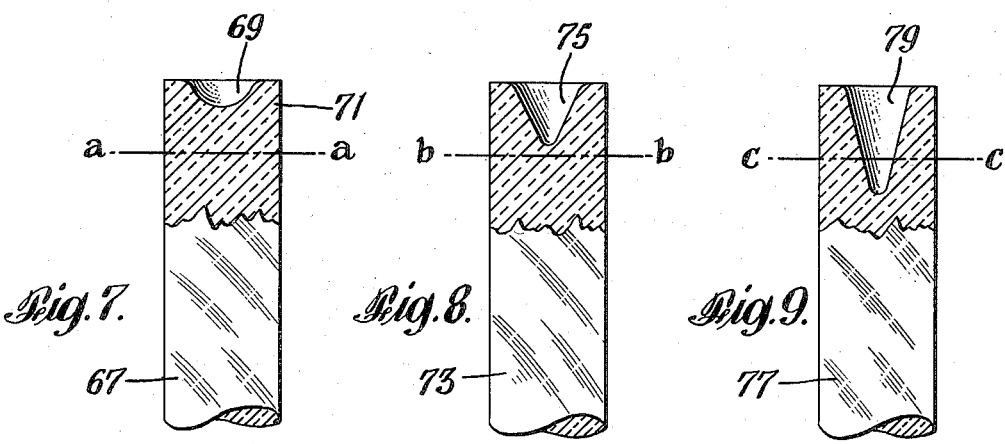
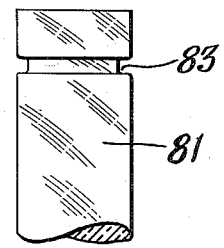
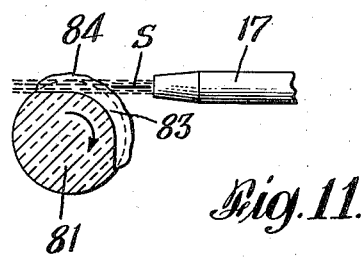
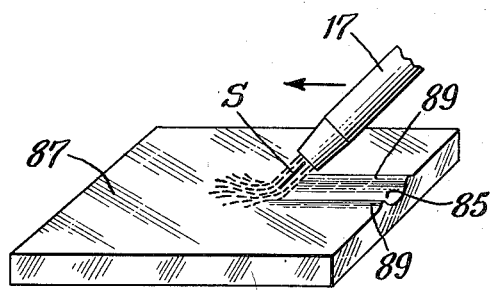
INVENTORS
GEORGE H. SMITH
DONALD M. YENNI
BY
ATTORNEY

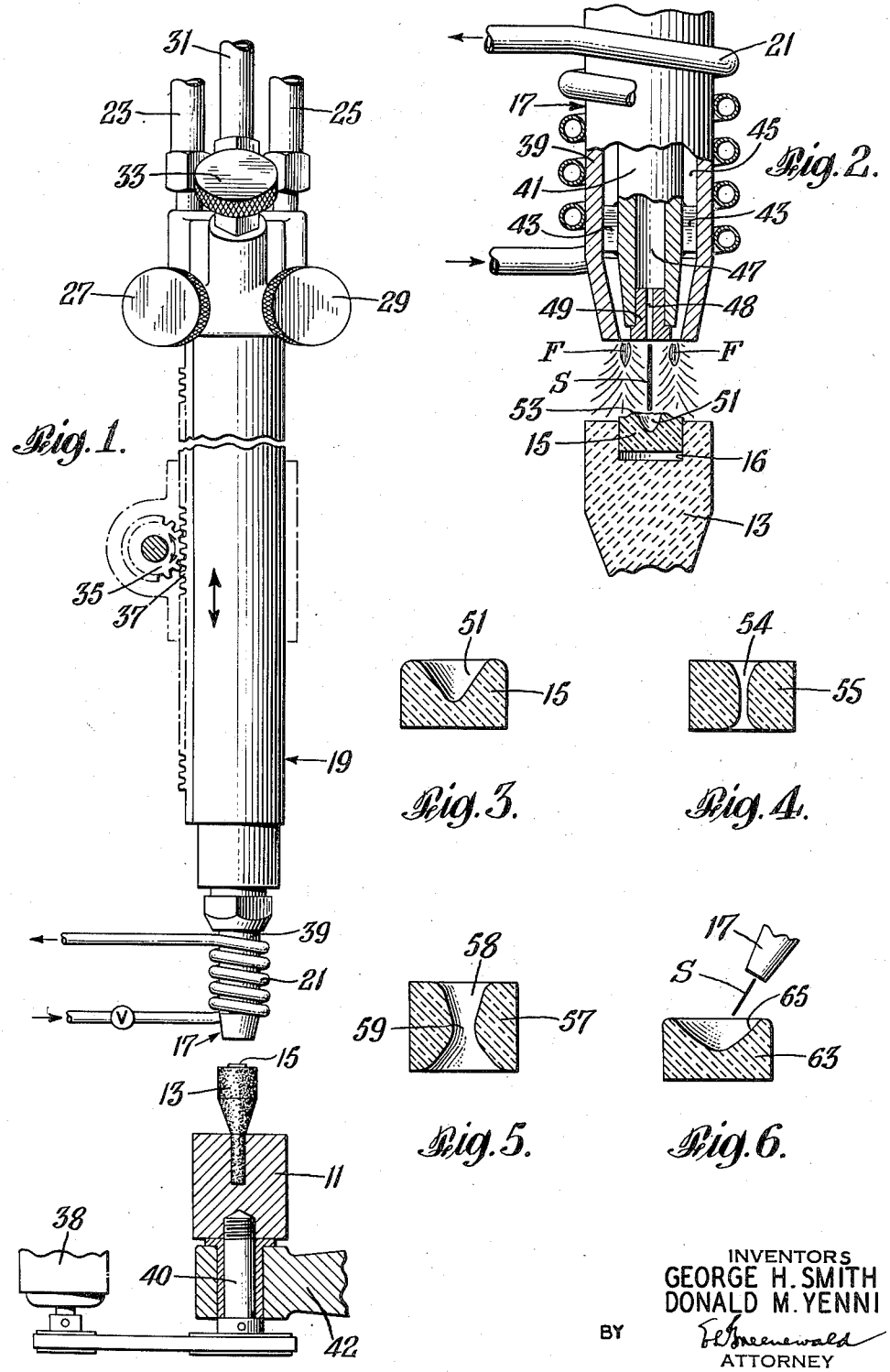

Patented Jan. 9, 1951

2,537,165

UNITED STATES PATENT OFFICE 2,537,165

SHAPING UNICRYSTALLINE BODIES OF MATERIAL SUCH AS CORUNDUM AND SPINEL

George H. Smith and Donald M. Yenni, Kenmore, N. Y., assignors to The Linde Air Products Company, a corporation of Ohio Application December 13, 1944, Serial No. 568,000

7 Claims. (Cl. 49—84)

Our invention relates to shaping solid bodies consisting of hard, non-combustible material such as single crystals of corundum and spinel, whether natural or synthetic, and the principal object of the invention is the provision of a novel process for rapidly, inexpensively, and accurately shaping such bodies by the controlled melting and displacing of material therefrom. Other objects are the provision of such a process which is especially suitable for forming holes in such bodies as a step in the manufacture of jewel bearings, thread guides, and similar devices; which provides the walls of such holes with surfaces offering improved wear resistance, and reduced frictional resistance to moving bodies cooperating therewith; and which also can be used for shaping the contours of such bodies. Another object is to provide a process for forming glossy, scratch-free surfaces on the internal walls of cavities which have been formed in such bodies by mechanical procedures; another object is to provide a novel process for rapidly shaping jewel bearings and similar articles from thin rods of corundum or spinel; still other objects are the provision of novel corundum or spinel bodies having cavities with smooth, glossy, scratch-free walls offering high wear resistance and low frictional resistance; and the provision of such bodies having grooves provided with glossy scratch-free surfaces. Another object is the provision of novel apparatus for performing the process of the invention.

Bodies consisting of extremely hard crystalline material such as single crystals of corundum (e. g. natural or synthetic rubies and sapphires) and spinel (e. g. magnesia-alumina spinel) have always had to be shaped mechanically heretofore by cutting, grinding, and polishing them with abrasive materials such as diamond powder. Such mechanical operations are slow, expensive, and laborious. Our novel process eliminates such mechanical operations entirely in the shaping of many articles of manufacture, and makes mechanical shaping necessary only for the finishing touches on other articles, such as some jewel bearings which require finishing with greater precision than is possible with the new process.

Instead of slowly and expensively mechanically shaping a unicrystalline body of material such as unicrystalline corundum (melting at about 2050° C.) or spinel (melting at from 1900 to 2150° C. depending on composition), it is rapidly and economically shaped according to our invention by applying against a selected zone of action a fine jet of gas which is sufficiently hot to melt a portion of the body and has sufficient mass velocity to displace the melted material in a controlled manner. Depending on the mass velocity of the jet and the shape to be formed, the melted material is either completely removed or is drawn away from the zone of jet action by surface tension. In the preferred procedure, at least a portion of the body is first preheated to a high temperature below its melting point in any suitable way, and thereafter the hot shaping jet of gas impinges against the body to simultaneously melt and displace material from the localized preheated zone. Flexible control of the temperature, mass velocity, and pressure of the shaping jet is possible with this preferred procedure.

An advantageous way for carrying out the preferred procedure comprises preheating a portion of the body to a high temperature below its melting point with a substantially annular oxy-fuel gas flame containing an excess of fuel gas over that which can be completely burned by the oxygen in the mixture, and while the body is in the preheated condition directing a concentrated hot shaping jet of combustion supporting gas such as air or oxygen centrally through the enveloping annular flame and against a localized surface area including the preheated portion, thereby simultaneously melting and removing portions of the body in the path of the jet. The central shaping gas jet is heated hot enough to melt the material both by heat transfer from the annular flame, and by the combustion of the excess fuel gas in the oxygen of the peripheral portion of the jet, thus becoming even hotter than the flame. The impingement of the flame and the hot shaping jet are continued while successive portions of the body in the path of the jet are melted and removed to the desired depth. It is evident that the substantially annular flame may be in the shape of a continuous ring, or may be made up of a plurality of small flames arranged in a ring. Also, the fuel gas for the oxy-fuel gas mixture may be, for example, city gas, acetylene, hydrogen, or the like; and the oxygen may be furnished by air, oxygen-enriched air, or substantially pure oxygen.

A combustible gas can be used for the shaping jet when the preheating flame mixture contains excess oxygen to combine therewith and burn in the peripheral portion of the shaping jet. Also, an inert gas such as nitrogen, carbon dioxide, or one of the rare gases can be employed for the shaping jet when sufficient heat is transferred from the preheating flame to make the shaping jet hot enough to melt the material. An alternative procedure is to perform the entire shaping operation by applying against the crystal body a fine high temperature flame having sufficient heating intensity and a high enough mass velocity to heat a zone of the body to its melting point and displace the molten material. This procedure is somewhat more difficult to control than the preferred procedure because the flame jet tends to be unstable when it has sufficient mass velocity.

Although the process of the invention is admirably suited for the formation of holes in bodies of corundum and spinel, as in the production of jewel bearings, thread guides, and like articles, it is also advantageous for removing surface material to shape the contours of such a body, as by melting and displacing surface portions by impinging substantially tangentially or obliquely against a surface of the body a flowing jet of gas hot enough to melt the material.

The surfaces of corundum and spinel articles which have been shaped by the process described above are smooth, glossy, free from scratches, and free from imbedded abrasive particles such as diamond. In contrast, articles polished, ground, and cut with abrasives always have minute scratches clearly visible under a microscope, and are also apt to have particles of the abrasive, such as diamond powder, imbedded in their surfaces. Obviously, scratch-free and abrasive-free surfaces greatly reduce the friction and wear between articles such as jewel bearings or thread guides and moving objects cooperating therewith.

In the drawings:

Fig. 1 is a side elevational view, partly in section, showing one form of apparatus for performing the process of the invention;

Fig. 2 is an enlarged side elevational view, parts being broken away and in section, of a part of the apparatus shown in Fig. 1;

Figs. 3, 4, and 5 are greatly enlarged vertical sectional views of three types of articles shaped by our process;

Fig. 6 is a schematic view, partly in side elevation and partly in section, showing an arrangement for performing a modification of our process;

Figs. 7, 8, and 9 are greatly enlarged vertical sectional views illustrating procedures for forming different types of jewel bearings from thin rods of crystalline material, such as corundum or spinel;

Fig. 10 is an enlarged side elevational view of a cylindrical body surface-shaped by the process of the invention;

Fig. 11 is a schematic view, partly in cross section, illustrating a procedure for surface shaping a body, such as shown in Fig. 10; and Fig. 12 is a schematic perspective view illustrating the formation of a shallow groove in a body having a plane surface.

Referring to Fig. 1, which shows apparatus for forming a hole in a small body 15 of material such as unicrystalline corundum or spinel which may be of the order of one-eighth inch diameter, a holder 13 of refractory material projects upwardly from a rotatable support such as a table 11 and supports the body 15 in any suitable manner, as by a frictional fit within a recess 16 in the top of the support (see Fig. 2). A burner nozzle 17 secured in the lower end of a blowpipe body 19 is arranged in vertical alignment with the support 13 for directing a heating flame F and shaping jets against the body 15. The nozzle 17 is protected against overheating by passing water, air, or any other suitable coolant through an external cooling coil 21 encircling the nozzle.

The blowpipe body 19 may be of the type conventionally employed for supplying both a combustible gas mixture and a stream of oxygen to a nozzle such as is used for flame cutting steel. Oxygen and fuel gas which are supplied to the body 19 by conduits 23 and 25, respectively, controlled by valves 27 and 29, mix together within the body to form a combustible gas mixture which is supplied to the nozzle 17. Oxygen, compressed air, or any other suitable gas under pressure for displacing melted material is supplied to the blowpipe body 19 by a third conduit 31 controlled by a valve 33 for regulating the pressure and mass velocity of the gas.

Relative translational movement between the support 13 and the nozzle 17 toward and away from one another is effected by rotating a pinion gear 35 cooperating with a rack 37 on the side of the blowpipe body 19. With this construction, the position of the nozzle 17 with respect to the support 13 can be adjusted prior to the commencement of the shaping operation and, if desired, the nozzle can be moved toward or away from the support during a shaping operation.

In order to insure a symmetrical hole in the body 15, the table 11 can be rotated about a vertical axis during the shaping operation in any suitable manner, if desired, as by an electric motor 38 driving a spindle 40 journalled in a bearing 42 and engaging at its upper end the table 11. Such rotation is essential when the burner nozzle is directed at an acute angle to the surface of the body 15, as for making V-bearings having wide cavities.

Referring to Fig. 2, one form of nozzle 17 suitable for performing the process comprises a tubular external member 39 enclosing a tubular internal member 41 which carries a plurality of spaced apart fins 43 for spacing the internal from the external. The combustible gas mixture for heating the body 15 flows through the annular passage 45 between the internal and the external and is discharged from the tip of the nozzle 17 in an annular stream which, upon ignition, burns as an annular flame F. The central passage 47 in the internal conducts oxygen, air, or other gas under pressure for melting and displacing material, into a small cylindrical constricted passage 48 in a plug 49 fitting tightly within the end of the internal 41; and the passage 48 discharges the gas toward the body 15 in the form of a fine, rapidly flowing shaping jet S. A divergent type nozzle wherein the passage 48 flares gradually to its exit also is productive of good results when very high jet velocities are desired.

With the apparatus shown in Figs. 1 and 2, a hole 51 can be shaped in a body 15 of corundum or spinel by first applying to such a body an annular gas flame F containing excess fuel gas to preheat at least a portion of the body to a high temperature below its melting point. Then the valve 33 is opened and the flow of the shaping jet of combustion supporting gas through the passage 48 begins. After its discharge from the constricted passage 48 the shaping jet S is heated directly by heat transfer from the flame F, and additionally by the burning of excess fuel gas therein, until it is sufficiently hot to melt the material of the body 15. Upon impingement at a large angle (approximately normally) against the localized preheated area on the body 15, the jet S simultaneously heats the center of the preheated area to its melting point and displaces the molten material from the zone of jet action to leave a cavity in such a way that the displaced material recrystallizes around the rim of the cavity as a slightly raised annular lip or "crown" 53 which later is ground off to form an article such as a jewel bearing shown in Fig. 3. When the desired shape of cavity has been produced the supply of gas to the passage 47 is shut off by closing the valve 33.

The shape and depth of the recess 51 is determined by the size and head pressure of the shaping gas jet S. A V-type recess can be formed, for example, when the jet orifice 48 has a diameter of 0.0047 inch and the head pressure is 40 to 100 lbs. per sq. in. Shallower holes, such as in jewel cup bearings, require larger jet orifices and lower head pressures. To produce a hole of the proper shape, it is sometimes desirable to vary the flow characteristics of the central shaping jet S by changing the adjustment of the valve 33 during the shaping operation to increase or decrease the mass velocity. Likewise, the temperature of the shaping jet and the heating intensity of the flame F can be varied by changing the adjustment of the valves 27 and 29 to change the ratio of gases in the combustible gas mixture or to change the discharge mass velocity of the mixture.

The corundum or spinel articles 55 and 57 shown in Figs. 4 and 5 have been completely pierced to form through holes 54 and 58 respectively. In the article 55 of Fig. 4 the hole 54 is formed by applying the jet S from only one side of the body. Fig. 5 shows a through passage 58 which flares gradually on both sides of a throat 59. Such a passage 58 can be made by applying the shaping jet S to one side of the body to form an aperture or cavity which flares from the bottom to the top as shown in Fig. 4, and then applying a similar jet to the opposite side to heat the blank around the aperture to cause the melted material to flow and complete the desired contour, as by opening the aperture so as to obtain the olive shape shown in Fig. 5. A similar result can be reached by forming two flaring cups which merge to form a throat. The articles of Figs. 4 and 5 are useful as jewel ring bearings and filament guides, and the latter is also useful as a Venturi throat for metering gases. Articles of the type shown in Figs. 3, 4, and 5 are manufactured by the process of the invention more rapidly and less expensively than by mechanically shaping them by cutting, grinding, and polishing. Moreover, the surfaces produced on such articles by the new process are free from imbedded abrasive particles and are smooth, glossy, and free from scratches. Consequently, they are especially advantageous for bearings and similar devices cooperating with moving bodies, because such smooth surfaces reduce friction and wear. Also, such a surface on a filament guide reduces the tendency of abrasive filaments to cut the guide prematurely as well as the tendency of the guide to fray the thread.

Usually the described articles can be used in the flame formed condition. However, if jewel bearings must be finished with greater precision than is possible with the flame forming procedure, blanks can be roughed out by flame shaping, after which the internal and external surfaces of the blanks can be dressed to the proper dimensions by a supplementary grinding and polishing operation. Subsequent momentary application of the hot jet S within the cavity glosses the ground and polished surface by recrystallizing it to a smooth surface, eliminates scratches, and consumes any imbedded particles of diamond. In this way the amount of mechanical shaping is reduced to a minimum.

When shaping is to be accomplished by the alternative procedure wherein a flame both melts and displaces material, the central passage 47 is supplied with a combustible gas mixture which is ignited to form a fine flame having high velocity outside the nozzle 17. No gas need then be supplied to the passage 45.

When a body 63 is to be shaped with a generally conical recess 65 which includes a large angle, as shown in Fig. 6, the nozzle 17 is so positioned with respect to the body that the hot shaping jet impinges against its top surface at an acute angle to both the top surface and to the axis of the desired recess while the body is rotated about the axis.

Jewel bearings and like articles can be quickly, economically, and accurately thermally shaped from thin rods of material such as corundum or spinel of suitable thickness, such as one-eighth inch for example, by applying the shaping jet S to the end surface of such a rod to form a cavity in the manner described in connection with Figs. 1 and 2, and subsequently slicing from the main body of the rod the portion containing the cavity. Fig. 7 shows a rod 67 having a shallow cup-shaped recess 69 which has been thermally shaped in the end of the rod by the shaping jet S. A jewel cup bearing is made from this rod by sawing or otherwise severing the cupped portion 71 from the main body of the rod along the line a—a at a point spaced from the bottom of the cavity on the side thereof remote from the end. Thereafter another cavity is thermally formed in the newly exposed end of the rod 67 which also is cut off. These operations can be repeated until the whole rod is converted into jewel bearings.

Fig. 8 shows a rod 73 thermally shaped with a V-type end cavity 75 which is converted into a V-bearing by severing along the line b—b.

Fig. 9 shows how a ring bearing is formed from a rod 77 by first thermally shaping a deep V-type cavity 79 in the end of the rod, and then severing along the line c—c between the end of the rod and the bottom of the cavity.

Fig. 10 shows a cylindrical body 81 provided with an annular groove 83 having a glossy scratch-free surface by the method of the invention. Such a groove is formed in the manner shown in Fig. 11, wherein the nozzle 17 is arranged to discharge both the heating flame and the shaping jet approximately tangentially against the top of the cylindrical body 81 while the body revolves on its longitudinal axis toward the nozzle, as in a conventional lathe. A small fin or lip shown at 84 ordinarily builds up on each side of the groove 83 and is subsequently ground off. Instead of forming a simple groove, the whole contour can be shaped with threads, shoulders, and the like by effecting relative translational movement between the nozzle 17 and the body 81 in the direction of the longitudinal axis of the latter to remove surface material along the length of the body. For example, cylindrical body 81 is mounted in a lathe and, while it revolves, the nozzle 17 is moved longitudinally of the body by a lead screw or similar device such as is conventionally used for traversing cutting tools in a lathe. Notches and other variations in shape also can be formed with a similar arrangement of apparatus by varying the operating conditions, as by holding the body 81 stationary, by rotating it through only a part of a revolution, or by varying the angle of impingement of the shaping jet S on the body.

By observing the general principles of the process described in detail above, it is also possible to produce on the body of material being shaped any surface of revolution, such as a circular cylinder, an elliptical cylinder, a cone, a paraboloid, an ellipsoid, or a sphere, by rotating a rough body consisting of crystalline material such as corundum or spinel about one or more centers while moving the shaping jet over the surface.

A groove or gouge 85 having a glossy scratch-free surface also can be shaped in a body 87 of crystalline material such as corundum or spinel by directing the hot shaping jet S from the nozzle 17 obliquely against and along the surface of the body in the manner shown in Fig. 12, to melt material and displace it from the path of the jet. Extension of the groove 85 can be accomplished by effecting relative movement between the nozzle 17 and the body 87 lengthwise of the groove in such a way that the nozzle 17 travels substantially parallel to the surface of the body. Small lips or fins 89 which are formed by the displaced material on each side of the groove 85 can be subsequently ground off. It is desirable for the best results, but not essential, for the jet S to impinge against the surface of the body 87 at an angle not exceeding 45°.

From the foregoing description it is evident that there has been provided a novel and advantageous process of rapidly, inexpensively, and accurately shaping hard, non-combustible bodies of material such as single crystals of corundum and spinel. The present invention has not only improved the manufacture of jewel bearings and similar articles which have always been made from hard abrasion resistant materials such as corundum and spinel, but also has greatly increased the range of practical uses to which such hard materials can be put by increasing the speed and decreasing the cost of fabrication.

Specific embodiments of the process of the invention have been described in detail above by way of illustration only. It is to be understood, therefore, that the scope of the invention is not limited to such specific embodiments, but embraces modifications of the process within the scope of the claims appended hereto.

What is claimed is:

1. A process for forming a jewel bearing or like article having a cavity therein from a unicrystalline rod of material such as corundum and spinel, such process comprising forming said cavity solely by melting and eroding material from said rod by applying against one end of such rod axially thereby a jet of hot gas having sufficient heating intensity to melt a portion of such rod and sufficient mass velocity to displace the melted material, leaving a cavity; and severing such rod at a point spaced from said end.

2. A process according to claim 1 wherein such rod is severed at a point spaced from the bottom of said cavity on the side thereof remote from said end.

3. A process according to claim 1 wherein such rod is severed at a point spaced from the bottom of said cavity between said bottom and said end.

4. A process for forming in a body of material such as unicrystalline corundum or spinel a passage having a throat intermediate the ends thereof, said passage flaring gradually on both sides of said throat, said process comprising directing against each of two opposite sides of said body a jet of gas sufficiently hot to melt said material and having a sufficient mass velocity to displace the melted material, each jet forming a cavity in said body which flares gradually from the bottom to the top, said cavities merging within said body and forming said throat.

5. A process for making an article such as a bearing or thread guide consisting of a unicrystalline body of corundum or spinel having a hole therein, said process comprising preheating a solid body of corundum or spinel to a high temperature below its melting point in an annular oxy-fuel gas flame; while said body is in such preheated condition, melting and displacing portions of said body by directing against a localized surface area thereof a concentrated shaping jet of oxidizing gas within said flame while heating said jet by enveloping it in said oxy-fuel gas flame and supplying to said flame an excess of fuel gas, said fuel gas mixing with and burning in a peripheral portion of said shaping jet; rotating said body on the axis of the desired hole; and continuing said shaping jet, so heated, to the desired depth of said hole, while displacing successive portions of said body in the path of said jet solely by melting and eroding said portions therefrom.

6. A process for thermally forming a cavity in a body of non-combustible material such as unicrystalline corundum or spinel comprising rotating said body on the axis of the desired cavity while displacing a portion of said body solely by melting and eroding said portion therefrom by directing a jet of hot gas at an acute angle thereon and intersecting said axis, such jet of gas being sufficiently hot to melt said material and having sufficient mass velocity to displace the material so melted.

7. A process for making an article such as a bearing or thread guide consisting of a unicrystalline body of corundum or spinel having a hole therein, said process comprising preheating a solid body of corundum or spinel to a high temperature below its melting point in an annular oxy-fuel gas flame; while said body is in such preheated condition, melting and displacing portions of said body by directing against a localized surface area thereof a concentrated shaping jet of oxidizing gas within said flame while heating said jet by enveloping it in said oxy-fuel gas flame and supplying to said flame an excess of fuel gas, said fuel gas mixing with and burning in a peripheral portion of said shaping jet; and continuing said shaping jet, so heated, to the desired depth of said hole, while displacing successive portions of said body in the path of said jet solely by melting and eroding said portions therefrom.

GEORGE H. SMITH.
DONALD M. YENNI.

(References on following page)

REFERENCES CITED

The following references are of record in the file of this patent:

UNITED STATES PATENTS

| Number | Name | Date |
|---|---|---|
| 474,286 | Brewster | May 3, 1892 |
| 874,666 | Gauthier et al. | Dec. 24, 1907 |
| 1,406,502 | Shand | Feb. 14, 1922 |
| 1,461,227 | Schwerin | July 10, 1923 |
| 1,597,293 | Ruff | Aug. 24, 1926 |
| 1,670,495 | Coberly | May 22, 1928 |
| 2,060,658 | Brown et al. | Nov. 10, 1936 |
| 2,090,861 | Eisele | Aug. 24, 1937 |
| 2,125,178 | Ullmer | July 26, 1938 |
| 2,208,139 | Serner | July 16, 1940 |
| 2,224,486 | Richter | Dec. 10, 1940 |
| 2,314,826 | Hinkley | Mar. 23, 1943 |
| 2,371,486 | Walker | Mar. 13, 1945 |
| 2,405,892 | Lederer | Aug. 13, 1946 |

FOREIGN PATENTS

| Number | Country | Date |
|---|---|---|
| 11,715 | Great Britain | 1915 |